(12) United States Patent
Kroskey et al.

(10) Patent No.: US 8,984,923 B2
(45) Date of Patent: Mar. 24, 2015

(54) PROGRAMMABLE ROLL FORMER AND ANGLE CUTTER

(75) Inventors: Dale Kroskey, Fayetteville, GA (US); Curtis Lafore, Wales, MI (US); Geoffrey Louis Stone, Peachtree City, GA (US)

(73) Assignee: Metalforming, Inc., Peachtree City, GA (US)

( * ) Notice: Subject to any disclaimer, the term of this patent is extended or adjusted under 35 U.S.C. 154(b) by 1020 days.

(21) Appl. No.: 12/688,971

(22) Filed: Jan. 18, 2010

(65) Prior Publication Data

US 2011/0174128 A1    Jul. 21, 2011

(51) Int. Cl.
*B21F 11/00* (2006.01)
*B21D 28/00* (2006.01)
*B21B 15/00* (2006.01)
*B23D 15/00* (2006.01)
*B21D 5/08* (2006.01)
*B23D 36/00* (2006.01)

(52) U.S. Cl.
CPC ............... *B23D 15/005* (2013.01); *B21D 5/08* (2013.01); *B23D 36/0058* (2013.01)
USPC .................. 72/131; 72/339; 72/177

(58) Field of Classification Search
CPC ................... B21D 5/08; B21D 5/14
USPC ........... 72/177, 178, 176, 181, 131, 129, 130, 72/339, 203, 332; 83/917, 692
See application file for complete search history.

(56) References Cited

U.S. PATENT DOCUMENTS

| | | | |
|---|---|---|---|
| 4,831,857 A | 5/1989 | Levy | |
| 5,163,311 A | 11/1992 | McClain | |
| 5,706,608 A | 1/1998 | Sweet | |
| 5,937,519 A * | 8/1999 | Strand | 72/385 |
| 6,289,708 B1 | 9/2001 | Keinänen | |
| 6,981,397 B2 * | 1/2006 | Meyer | 72/181 |
| 7,080,538 B1 * | 7/2006 | Neudorf | 72/332 |
| 7,310,984 B2 | 12/2007 | White | |
| 7,712,345 B1 * | 5/2010 | Chen | 72/177 |
| 7,797,813 B2 * | 9/2010 | Hashimoto et al. | 29/564 |
| 2008/0141749 A1 * | 6/2008 | Heinz | 72/177 |
| 2009/0025446 A1 * | 1/2009 | Ingvarsson | 72/177 |

* cited by examiner

*Primary Examiner* — Shelley Self
*Assistant Examiner* — Mohammad I Yusuf
(74) *Attorney, Agent, or Firm* — Thomas Horstemeyer, LLP

(57) ABSTRACT

A programmable machine for roll forming metal decoiled from a roll of metal and cutting the panels at a desired angle is provided. The roll former can form male and female edges on the metal which are necessary for a metal roof. The machine has a notcher to notch the metal where it is to be cut in order to avoid difficulty in cutting through a male or female edge. An exit cutter is provided after the metal has been roll formed. The angle at which the exit cutter can cut is also calculated in the programmable computer. A measuring device for measuring the roof and transferring the data to the programmable machine for cutting the panels completes a system for automatically and accurately cutting the panels for the roof.

20 Claims, 10 Drawing Sheets

PROGRAMMABLE ROLL FORMER AND ANGLE CUTTER

FIELD OF THE INVENTION

This present invention discloses a machine and method for roll forming metal decoiled from a roll of metal and cutting panels from the roll of metal at a desired location and angle.

BACKGROUND OF THE INVENTION

Metal panels are often employed in roofing systems or other structures. Converting data regarding a complex roofing system or structure into precise measurements, dimensions, and cut angles of metal panels can pose a challenge to an operator on a job site. This is a labor intensive process potentially involving hand measuring and hand cutting of panels.

DETAILED DESCRIPTION OF THE INVENTION

The present invention relates to a roll former and process by which a panel of a desired configuration can be formed. This panel can be used as a roofing panel. The following is a list of parts for one embodiment of this invention:

PARTS LIST

Figure 1:
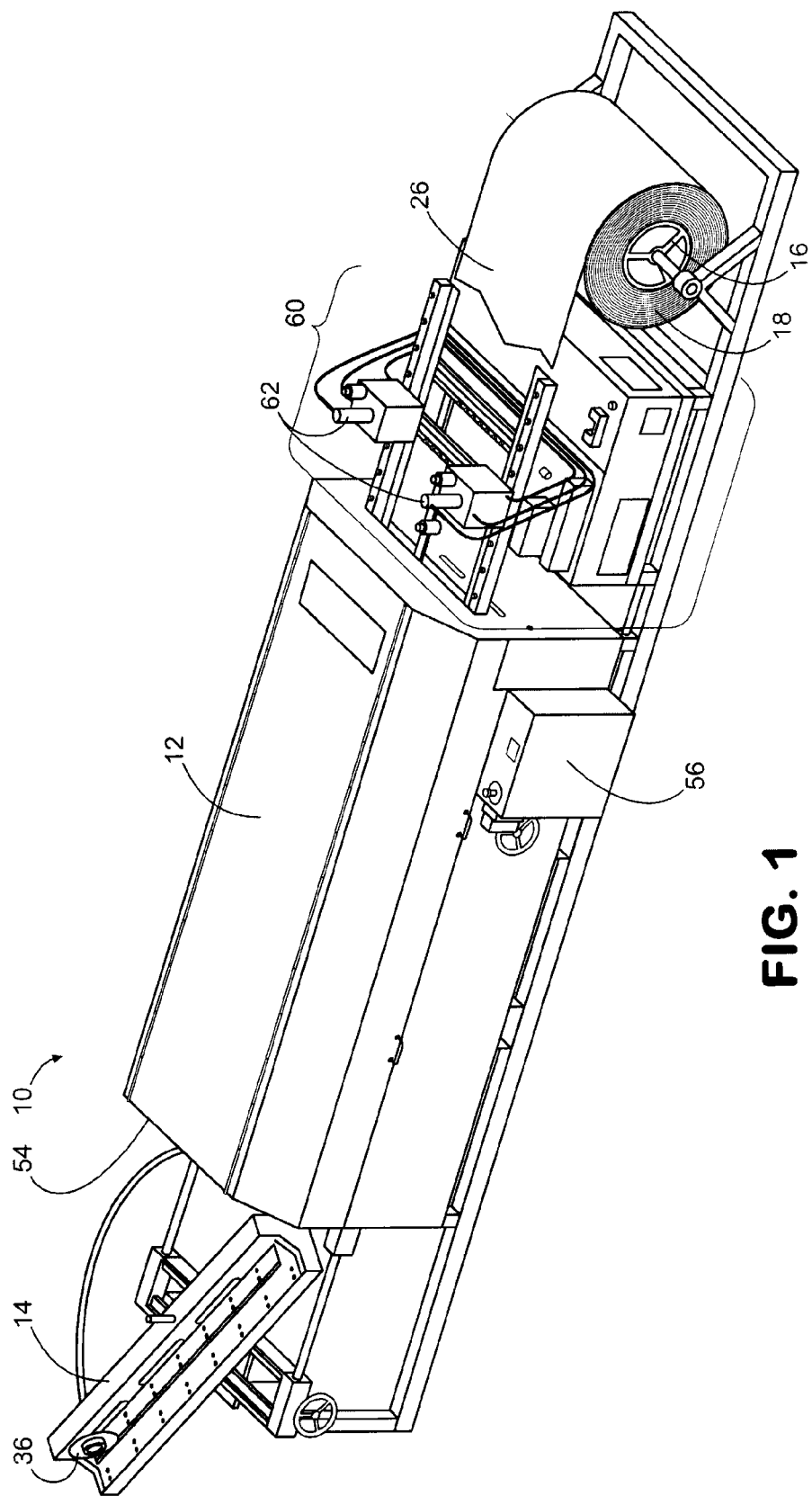
FIG. 1 is a perspective view of a forming machine according to an embodiment of the disclosure.
Figure 2:
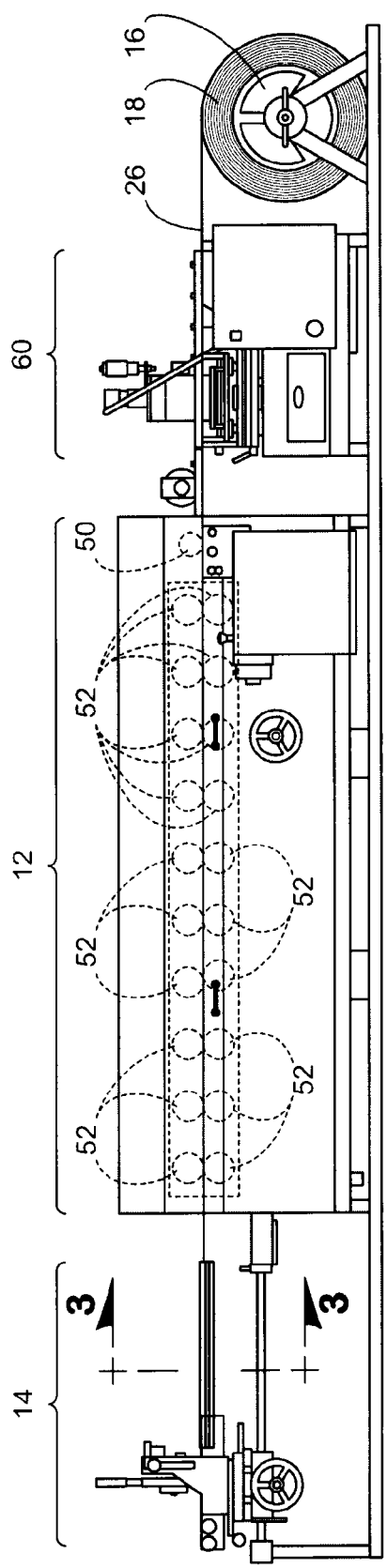
FIG. 2 is the cross-section of the forming machine of FIG. 1.
Figure 4:
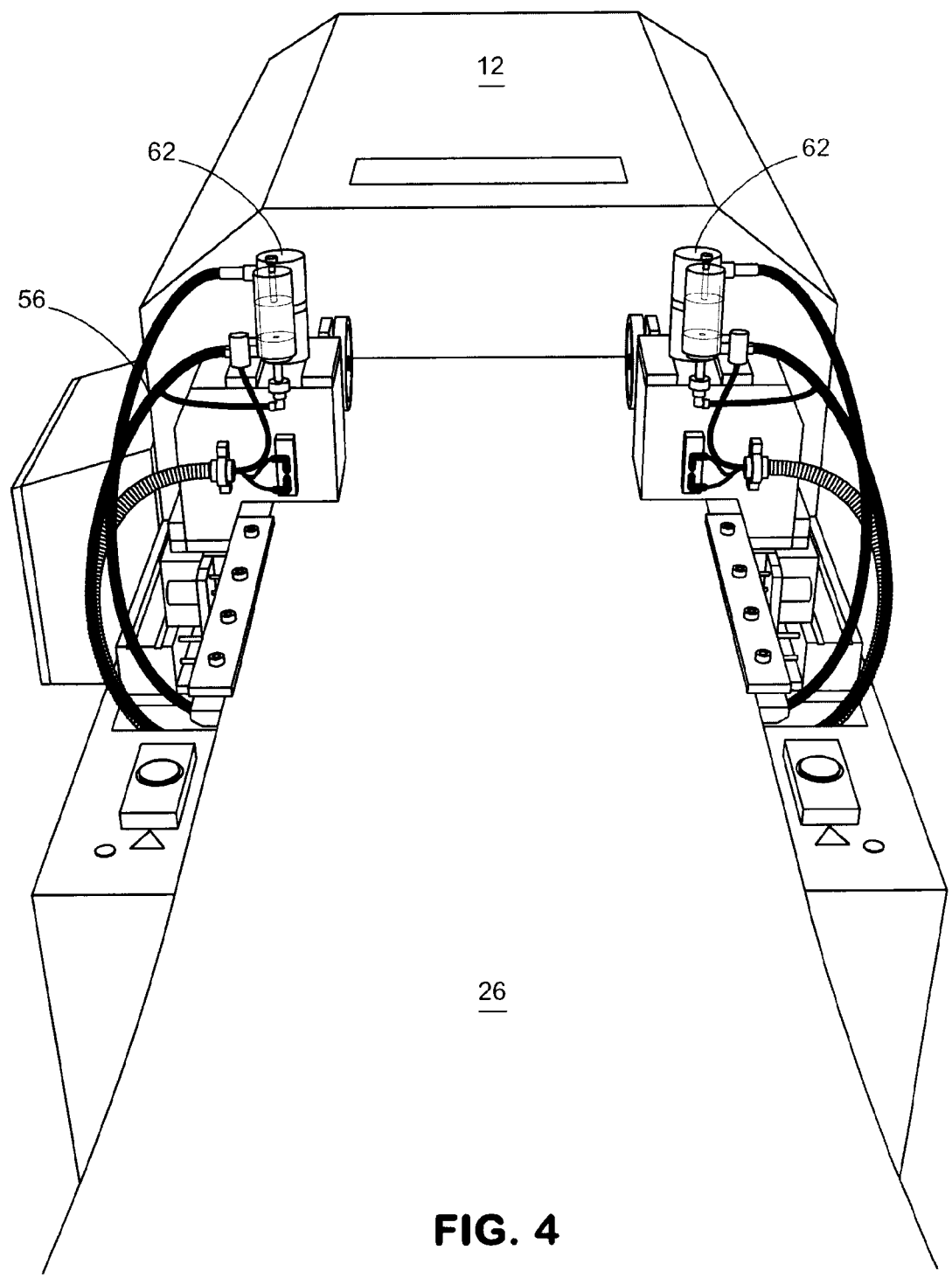
FIG. 4 is a perspective view of the notcher of the forming machine shown in FIG. 1.

Forming machine
12. Roll former
14. Exit Cutter
16. Decoiler reel for metal
18. Metal coil
26. Metal
36. Shear wheel
50. Metal cutter
52. Rolling dies
54. Machine exit
56. Programmable controller
60. Notching device
62. Hydraulic cylinders
90. Cross section of panel
94. Metal panel
96. Female edge
98. Male edge
102. Notches
104. Notches
106. Cutting line
110. Auxiliary display screen
112. Emergency shut off button
120. Representative layout
122. User interface to select panel pattern
144. Pause/Next panel button One embodiment of a forming machine 10 has a roll former 12, notching device 60 and exit cutter 14 as shown in FIG. 1. The forming machine 10 has a decoiler reel 16 and may have a notching device 60. Additionally, the forming machine 10 includes a programmable controller 56 that can direct and/or automate the process of decoiling metal from the decoiler reel 16, notching metal in one or both of a parallel or angled pattern in the notching device 60, forming metal in the roll former 12 and cutting metal to desired length and configuration in the exit cutter 14. FIG. 2 depicts a cross-sectional view of the forming machine 10 and also depicts the above elements of the machine. FIG. 4 depicts a perspective view of metal 26 entering the notching device 60 and roll former 12 from the decoiler reel 16. The forming machine 10 can be placed on a trailer for transporting to the installation site. After being notched the steel is transported into the roll former 12 where it is configured and can be cut into sheets. This notching device 60 can be used to notch the steel that will become the formed flanges of the panels, or could also be used to notch an access hole in the panel to allow access to bottom mounted electrical contacts that could be used in some building applications.

Nearly any metal that has sufficient flexibility and thinness can be formed on the forming machine 10. Among these metals are copper, zinc, stainless steel, galvanized steel, prepainted steel, gavalume, and aluminum. These metals are placed on the decoiler reel 16 so that they can be unrolled freely.

The notching device 60 makes notches in the steel after it is pulled off the metal decoiler reel 16. After being notched, the steel can be pulled into the roll former 12 where it is cut and configured. It is subsequently cut into sheets by the exit cutter 14. The exit cutter is attached to a point so the programmable controller can direct it to the proper angle and location for cutting. This notching device 60 can be used to notch the steel that will become the roll formed flanges of the panels, or could also be used to notch an access hole in the panel to allow access to the inside of the building or the support upon which the panels are mounted that could be used in some building applications. As these roof panels usually have a female edge on one side of the panel and a male edge on the other side of the panel, it is often necessary to punch a notch or hole in the female and male edge where it is determined to cut the panel at metal cutter 50 upon exit from the roll former 12 and at the exit cutter 14. Without such a notch or hole it may be difficult to cut the sheet.

The notching device 60 is capable of forming a notch or hole on each edge of the metal 26 as directed by the programmable controller 56. In some embodiments, a notch or hole can be formed on each edge of the metal where the exit cutter 14 will cut the metal 26 so that the exit cutter 14 can more easily cut the material exiting the roll former 12. In some embodiments, the notching device 60 can also form an angled notch or hole on each edge of the metal 26 to facilitate cutting of an angled panel. The notching device 60 is preferably a punch that is hydraulically or pneumatically operated as directed by the programmable controller 56. The length of the notch can be approximately two inches but it can be expanded to four inches or more if desired by either tooling adjustments, changes, or additional length indexes as determined by the programmable controller 56. The programmable controller 56 can also determine and/or vary the size of notches based at least upon an angle of an edge of a panel. The ability to compensate for notch length as a function of angle degrees is also calculated to provide for optimum extended flat portions of the panel for closure and/or attachment to a structure.

The exit cutter 14 can be a rotary shear or other type of blade as can be appreciated for cutting metal 26 or similar materials. The exit cutter 14 can also be rotated about the metal exiting the roll former 12 to cut roll formed metal into angled panels. As one example, angled panels can serve various building applications, such as in a roofing system. In some embodiments, an angle indicator can be incorporated into the exit cutter 14 to allow an operator to view an accurate angle of a cut before initiating the cut at the exit cutter 14. The exit cutter 14 can further include a clamping system that allows the metal 26 exiting the roll former to be secured or clamped into place for cutting by the exit cutter 14.

The shear wheel 36 can be powered by an electric motor (not shown) to cut the metal. The programmable controller 56 can facilitate moving of the shear wheel 36 to the proper location for cutting the metal. It should be understood that other types of cutting instruments can be used for cutting the metal.

In other embodiments, the exit cutter 14 can be an automated cutting system that requires no operator intervention. The shear wheel 36 can be controlled by moving means, such as an electric motor (not shown) which is controlled by the programmable controller 56. The angle and location of the exit cutter 14 can also be controlled by the programmable controller 56

In the depicted example, the notching device 60 has at least one hydraulic cylinder 62 that drives a metal punch. The punch can cut a hole in the metal 26 as directed by the controller 56. Various types and shapes of punches may be used to affect cuts or notches in the metal of various depths.

As shown in FIG. 2, the metal 26 is pulled from metal coil 18, through the notching device 60 and into the roll former 12 by rolling dies 52 that will form the metal flanges into the various configurations. The various configurations can include, but are not limited to, a snap lock, mechanical lock, soffit/wall, and/or nail strip panel of varying heights. There are multiple rolling dies 52 on each side of the roll former 12 arranged in removable cassettes. In the depicted example, a cassette includes several rolling dies 52 that are disposed on each side of the roll former. Accordingly, a removable cassette including several rolling dies 52 provides for rapid profile changeover, as various rolling dies 52 having various profiles can be incorporated into the roll former 12. The rolling dies 52 form the profile on each side of the sheet and move the metal 26 through the roll former 12. One of the cassettes forms a male side of the sheet with forming rollers 52 and another cassette on an opposing side of the sheet forms the female side of the sheet. Male and female sides of the metal panels are formed so that sheets produced by the forming machine can be fitted together.

Rollers can be provided on both sides of the roll former 12 to produce a concave sheet of metal in the linear direction if needed.

The forming machine 10 also includes a programmable controller 56 that directs the process of moving metal 26 through the notching device 60, the roll former 12, and the exit cutter 14. The programmable controller 56 allows the process to be programmatically controlled. In other words, a complete structure comprising at least one, and often many, panels that are notched, formed, and cut by the forming machine 10 to be mapped out and/or designed by employing software that facilitates the creation of the layout of such a structure. The programmable controller 56 allows structures having various planes, angles, facets, and other complexities to be imported into the programmable controller 56. Then, the various panels forming a complete structure can be made by an operator with the assistance of the controller 56. In one example, roofing structures comprising panels having various sizes, and other characteristics can be created.

Accordingly, the measurements, dimensions, and other aspects of each panel of the structure can be determined by design software that can be imported into the programmable controller 56, which can instruct the notching device 60 how to notch each panel produced by the forming machine 10. In other embodiments, the measurements, dimensions, and other aspects of a structure on which a roof is to be constructed can be determined by measurement devices or systems that are on site. As one non-limiting example, a laser phase shift scanner can scan a structure on which a roof is to be constructed in order to determine precise measurements of the various facets or planes that comprise a roofing system, thereby facilitating cutting of metal panels that comprise such a roofing system. As additional non-limiting examples, point-to-point measuring assist devices, laser scanners, photogrammetry devices, stereo-photography systems, or other three dimensional measurement systems can be employed in similar fashion. Precision measurement data such as this can be imported into the programmable controller 56 in order to facilitate precise cutting of metal planes forming a roofing system.

Accordingly, the controller 56 can instruct the roll former 12, particularly the rolling dies 52 how to facilitate roll forming a panel. In one embodiment, the controller 56 can specify a rate at which the rolling dies 52 or other means move metal 26 through the forming machine 10. Finally, the controller 56 can instruct an operator when to activate the exit cutter 14 in order to cut metal 26 moving through the forming machine 10 in order to create a panel. The controller 56 can also instruct an operator as to the angle at which the exit cutter 14 should be activated in order to create an angled panel. In some embodiments, the programmable controller 56 can activate an automated exit cutter 14 to create panels from the forming machine 10.

The programmable controller 56 can also be provided in a networked environment so that the programmable controller 56 can be modified, maintained, or in communication with another computing device accessible via a network. In this way, a user of an embodiment of the disclosure may download a structure for which the forming machine 10 can be configured from a remote location. In other embodiments, remote support for a user of the programmable controller 56 can be provided via a network to which the controller 56 is attached.

In some embodiments, the programmable controller 56 can import electronic representations of a building and determine the appropriate panels that should be formed in order to construct a roofing system. As a non-limiting example, building information modeling, which can define the spatial relationship between various components of a building structure, can be imported into the programmable controller 56, which can then determine the appropriate panels comprising a roofing system that should be cut.

A measuring device for measuring the roof can be incorporated with a roll forming machine to form a system for measuring and cutting panels to form a roof. This measuring system may be based upon laser or infrared technology. This measuring system can be located on the roof of the building or located on the ground near the building. The measuring system may be connected by wire to the controller for the roll forming machine.

One example of a satisfactory measuring system is the Leica Flexline which comes complete with software and can be connected by wire to the roll forming machine or through Bluetooth® wireless technology. The Leica Flexline system allows the measurement of roofs that have various angles in them. The data from the Leica Flexline system can be transferred to the controller of the roll former by cable, by USB memory stick or in a wireless manner.

Another system is the TDS Nomad that is used with a laser system for measuring with the Nomad handheld computer collecting, saving and transmitting the data in the field. It can be done wirelessly or the Nomad computer can be connected by a cable to the controller on the roll forming machine.

These measuring systems can be used for measuring a roof where the panels are all in one plane or where there are a number of valleys and turns in the roofing system.

The incorporation of a measuring device and method with the roll forming machine completes a system for measuring the roof and cutting the panels for installation according to the roof measurements. It constitutes a complete system.

A number of other systems such as photo-grametry or stereophotography could be used to be part of the system for measuring and cutting roofing panels.

This system for measuring and cutting roofing panels can lead to the development of a Computer Integrated Roof Manufacturing (CIRM). The roll forming machine is basically referred to as a computer integrated notching cutting operation (CINCO).

The controller on the roll forming machine can be part of the machine or a detached PC can be used for wireless communication with the controller.

In yet other embodiments, the programmable controller 56 can wirelessly communicate with the remainder of the forming machine 10 so that an operator can manipulate the controller 56 and allow the remainder of the forming machine 10 to be located elsewhere. As one non-limiting example, in some roofing system projects, a roll former can be lifted via crane directly onto or near the roof structure of a building. Accordingly, an operator can direct operation of the forming machine 10 via a wirelessly connected programmable controller 56.

Figure 3:
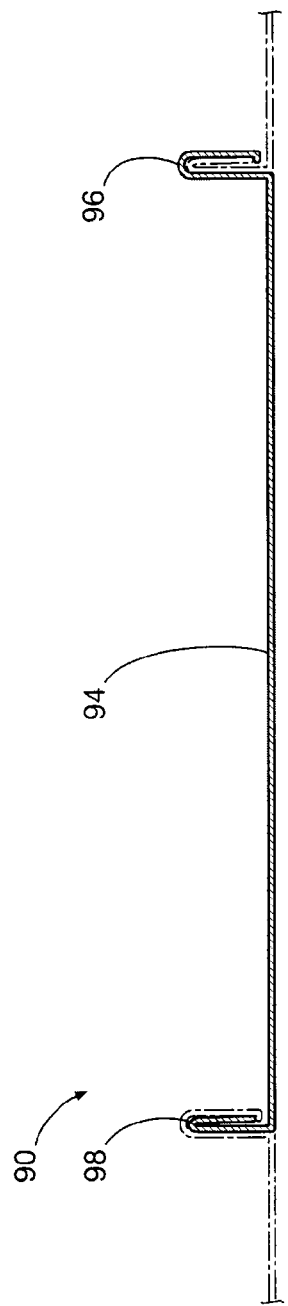
FIG. 3 is the cross-section of one type of metal roofing panel.

FIG. 3 illustrates one example of a cross section 90 of a metal panel 94 formed by one embodiment of the forming machine 10. The metal panel 94 has a female edge 96 and a male edge 98. The female edge 96 of a first metal panel 94 can engage the male edge 98 of a second metal panel 94.

Figure 3A:
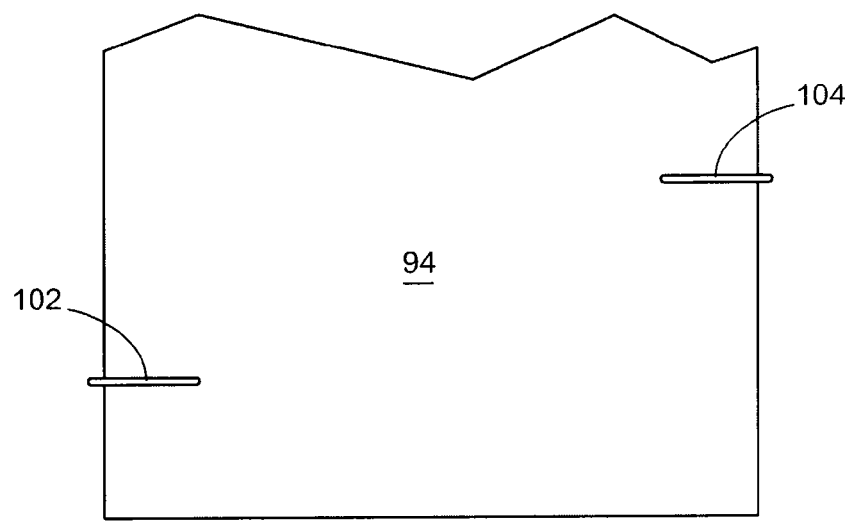
FIGS. 3A-3C illustrates one type of metal roofing panel formed by the forming machine of FIG. 1.
Figure 3B:
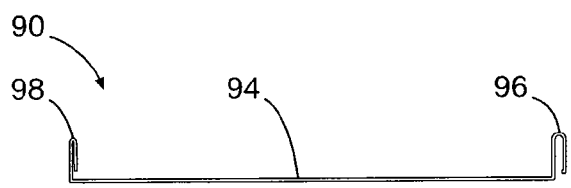

FIGS. 3A-3B illustrates the metal panel 94 of FIG. 3 formed by the forming machine of FIG. 1 throughout the various stages of the forming machine 10. FIG. 3A depicts the metal panel 94 in which notches 102, 104 are cut by the notching device 60 of the forming machine 10. As noted above, the notching device 60 can form notches in various positions on the metal panel 94 in order to facilitate cutting by the exit cutter 14. FIG. 3B depicts the metal panel 94 that has been roll formed by the roll former 12 of the forming machine 10. As noted above, in one embodiment, a male edge 98 and female edge 96 can be imparted on the metal panel 94 by the roll former 12 and its various rolling dies 52 in order to facilitate assembly of multiple metal panels into a complete structure.

Figure 3C:
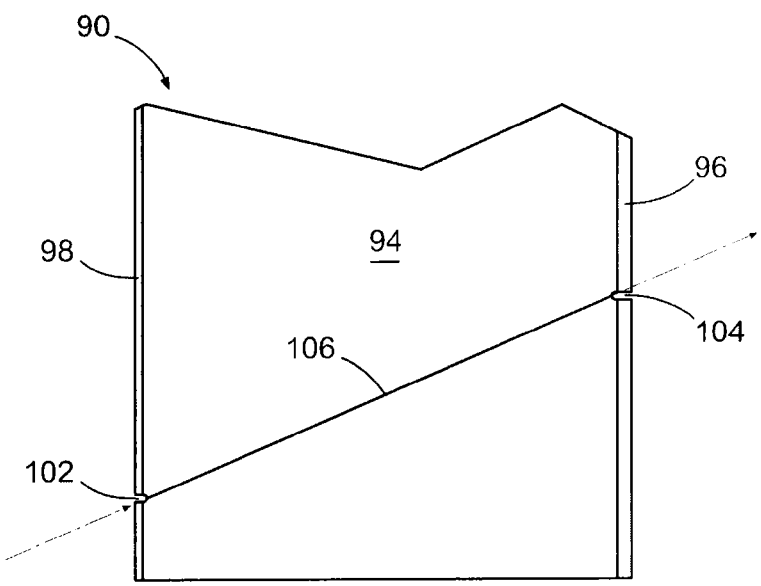

FIG. 3C depicts a metal panel 94 that is cut by the exit cutter 14 along cutting line 106. The cutting line 106 is shown for illustrative purposes only, and may not be imparted on the metal panel 94. However, in some embodiments, a cutting line 106 can be painted, etched, or otherwise placed on the metal panel 94 to facilitate cutting later. In the depicted metal panel 94 of FIG. 3C, the notches 102, 104, male edge 98 and female edge 96 have been imparted on the metal panel 94, which facilitates cutting by the exit cutter 14 of a finished panel for use in a structure.

FIG. 4 is a perspective view of the front end of the forming machine 10. Specifically, FIG. 4 depicts metal 26 entering the notching device 60 of the forming machine. As noted above, the notching device 60 includes hydraulic cylinders 62 positioned on either edge of the metal 26 so that notches can be formed to facilitate cutting of a metal 26 by the exit cutter 14. The notching device 60 can also be controlled by the programmable controller 56 in order to programmatically direct the production of various metal panels of a complete structure, or for precision production of a single panel.

Figure 5:
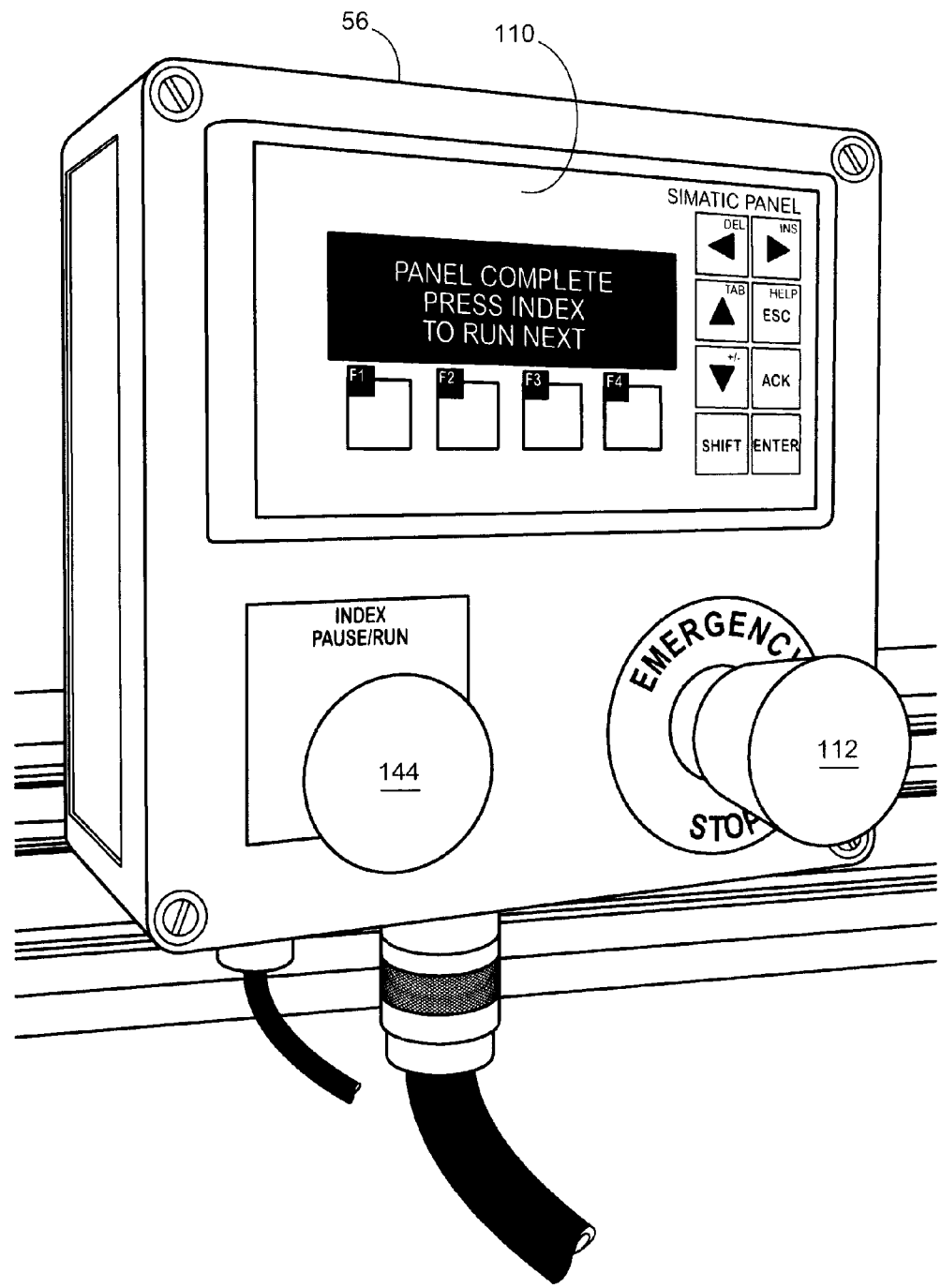
FIG. 5 is a drawing of the auxiliary operator screen of the programmable controller for directing the roll former to move material through the roll former and for directing the cutter to cut the material at a desired length and angle.

FIG. 5 depicts one example of a programmable controller 56 of the forming machine. The programmable controller can be mounted on the forming machine or in communication with the forming machine 10 in order to direct the process of producing panels. In one embodiment, the forming machine 10 can comprise a computer system. The computer system may include one or more processor circuits having a processor and a memory, both of which are coupled to a local interface. In this respect, the local interface may comprise, for example, a data bus with an accompanying control/address bus as can be appreciated.

In some cases it may be desirable to control the machine with a wireless programmable computer. This is especially useful when the forming machine is lifted to the roof of the building for cutting metal.

Metal 26 is cut near the entry to the roll former 12 preferably by a rotary shear wheel or other means as directed by the programmable controller 56.

Stored on the memory and executable by the processor are various components such as an operating system and software that facilitates directing the activities of the forming machine's 10 various components. In addition, it is understood that many other systems or components may be stored in the memory and executable by the processors. Also, such components may reside in a memory that is external from the computer system as can be appreciated.

As set forth above, the operating system and other software are stored in the memory and are executable by the processor. In this respect, the term "executable" refers to a program file that is in a form that can ultimately be run by the processor. Examples of executable programs may be, for example, a compiled program that can be translated into machine code in a format that can be loaded into a random access portion of the memory and run by the processor, or source code that may be expressed in proper format such as object code that is capable of being loaded into a random access portion of the memory and executed by the processor. An executable program may be stored in any portion or component of the memory including, for example, random access memory, read-only memory, a hard drive, compact disk (CD), floppy disk, or other memory components or input/output (IO) devices.

The memory is defined herein as both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor may represent multiple processors and the memory may represent multiple memories that operate in parallel. In such a case, the local interface may be an appropriate network that facilitates communication between any two of the multiple processors, between any processor and any one of the memories, or between any two of the memories, etc. The processor may be of electrical, optical, or of some other construction as can be appreciated by those with ordinary skill in the art.

The operating system is executed to control the allocation and usage of hardware resources such as the memory and processing time in the computer system. In this manner, the operating system serves as the foundation on which applications depend as is generally known by those with ordinary skill in the art.

As noted above, data regarding a layout or other representation of a structure can be loaded into the programmable controller 56 so that the controller 56 can direct the notching device 60, roll former 12 and exit cutter 14 so that the controller 56 can direct the production of metal panels comprising the complete structure. Data can be loaded into the controller 56 via an input/output device, such as, a USB storage device, or other devices that should be appreciated. In other embodiments, the controller 56 can be accessible via a local area or wide area network, and data can be loaded into the controller 56 via the network access. Data from the roof design can be loaded into the controller 56. Measurements can be taken on the job and any variations of the design corrected in the controller 56. This is necessary as roofs are not always built to the design specifications and drawings.

In the depicted embodiment, the controller 56 includes a touch screen 110 with which an operator can interact in order to control the notching device 60, roll former 12 and exit cutter 14. The controller 56 can also include an emergency shutoff button 112 for shutting down the forming machine 10 in the case of an emergency. The controller can also include a pause button 144 for pausing and/or activating the forming machine 10.

Figure 6:
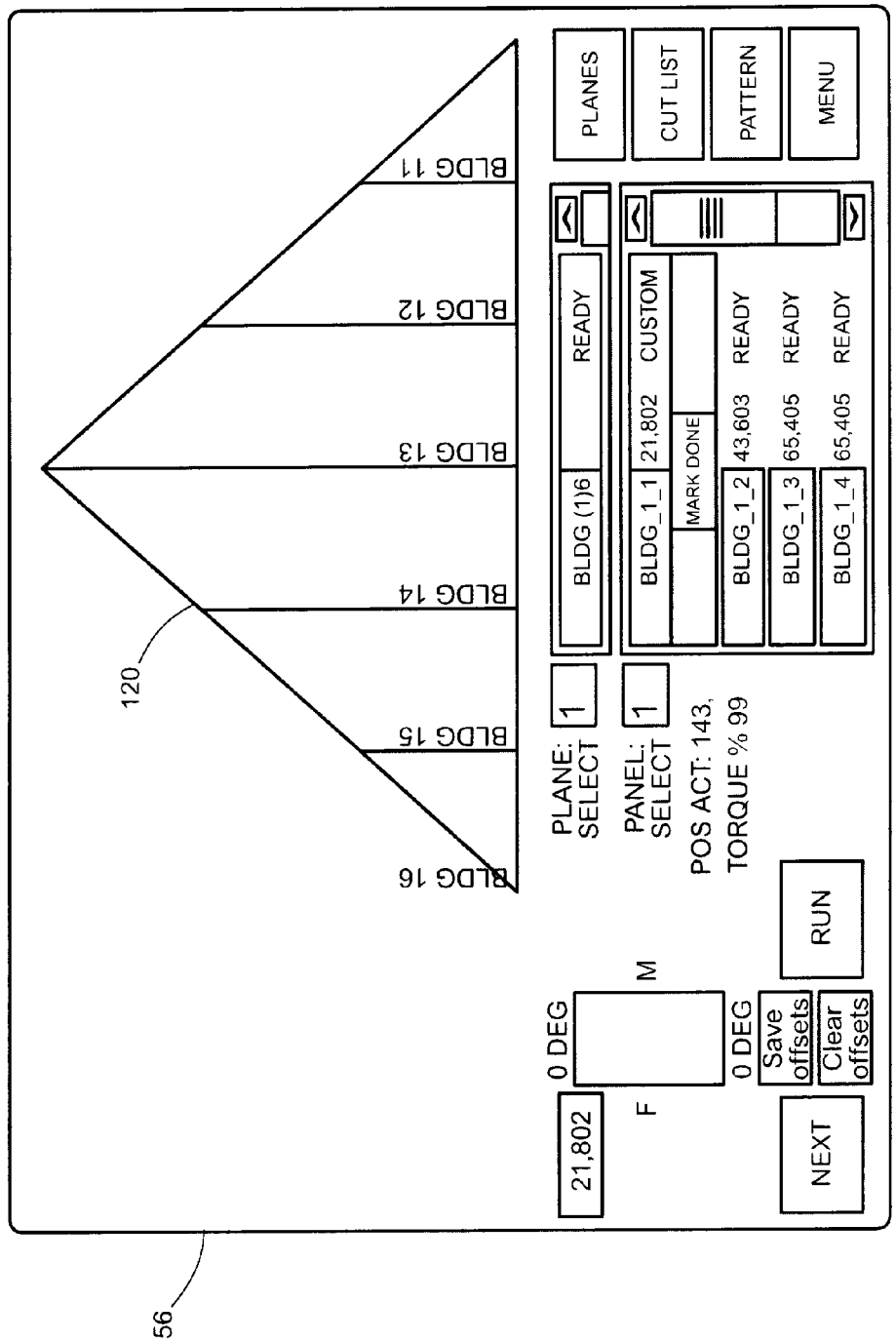
FIG. 6 is the main user interface generated by the programmable controller.

FIG. 6 depicts a user interface generated by the controller 56 with which an operator can interact. The depicted example is shown for illustrative purposes, and is not intended to represent an exhaustive view of the functionality that a programmable controller 56 according to an embodiment of the disclosure can implement. In the depicted user interface of FIG. 6, the programmable controller depicts a representative layout 120 of a structure that can be produced by the forming machine 10. In this non-limiting example, the layout loaded into the controller is a triangular structure comprising a plurality of panels that can be joined by male and female edges. Accordingly, given this particular structure, the programmable controller 56 can determine how metal 26 moving through the forming machine 10 should be notched by the notching device 60, cut by the metal cutter 50, formed by the roll former 12, and cut by the shear wheel 36 of the exit cutter 14 to enable an operator to quickly produce metal panels so that the depicted layout 120 can be constructed.

Figure 7:
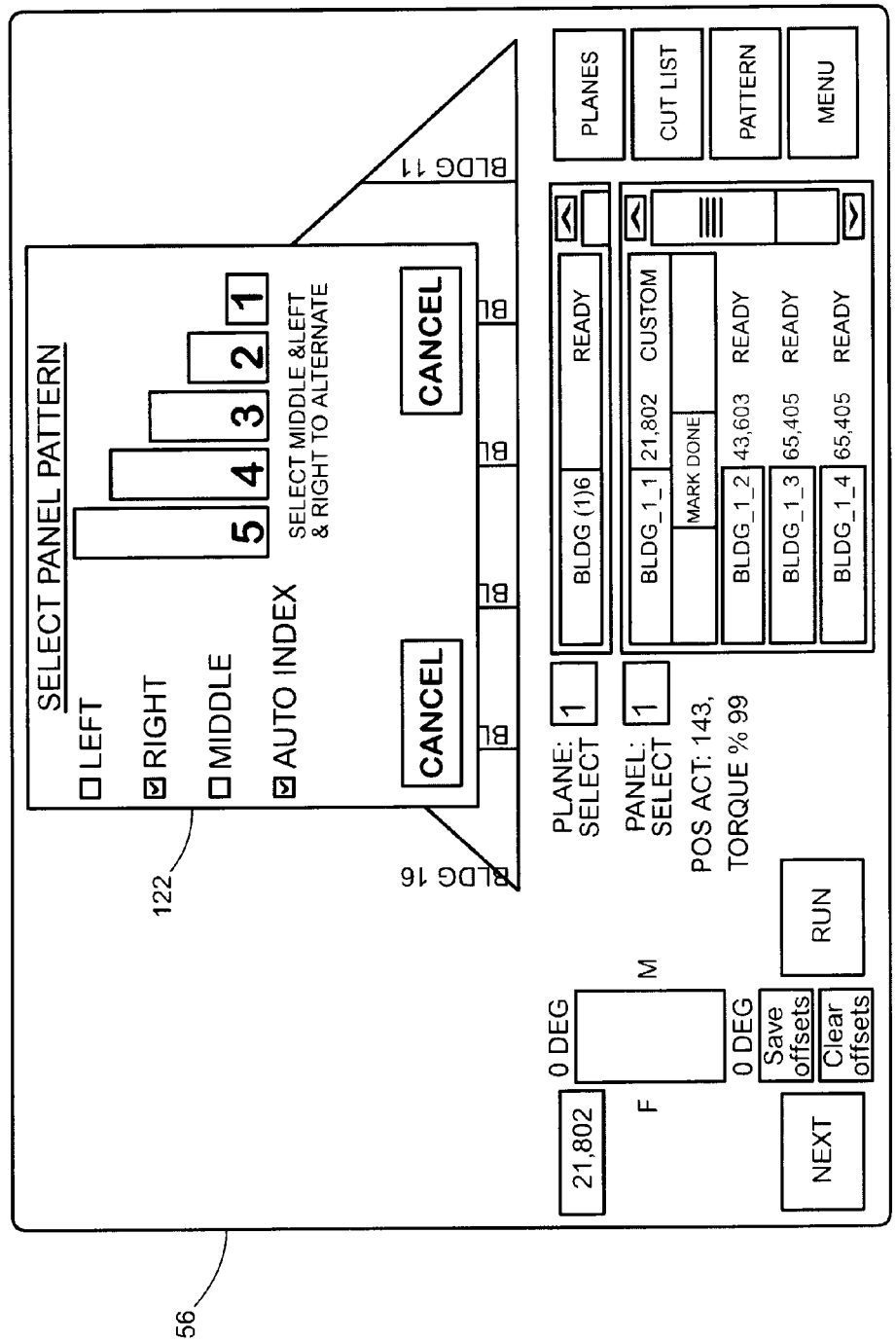
FIG. 7 is an alternative user interface generated by the programmable controller.

FIG. 7 depicts an alternative user interface 122 generated by the controller 56, which allows an operator to determine the order in which panels comprising the structure represented by the layout 122 are created by the forming machine 10. For example, the panels comprising the structure can be created in a left-to-right, right-to-left, or center-out fashion. In addition, the panels comprising the structure can be created in any order desired by the operator. In some embodiments, the forming machine 10 can etch or otherwise impart a numbering or ordering scheme on the panels so to facilitate assembly of a plane of a structure in the proper order.

Figure 8:
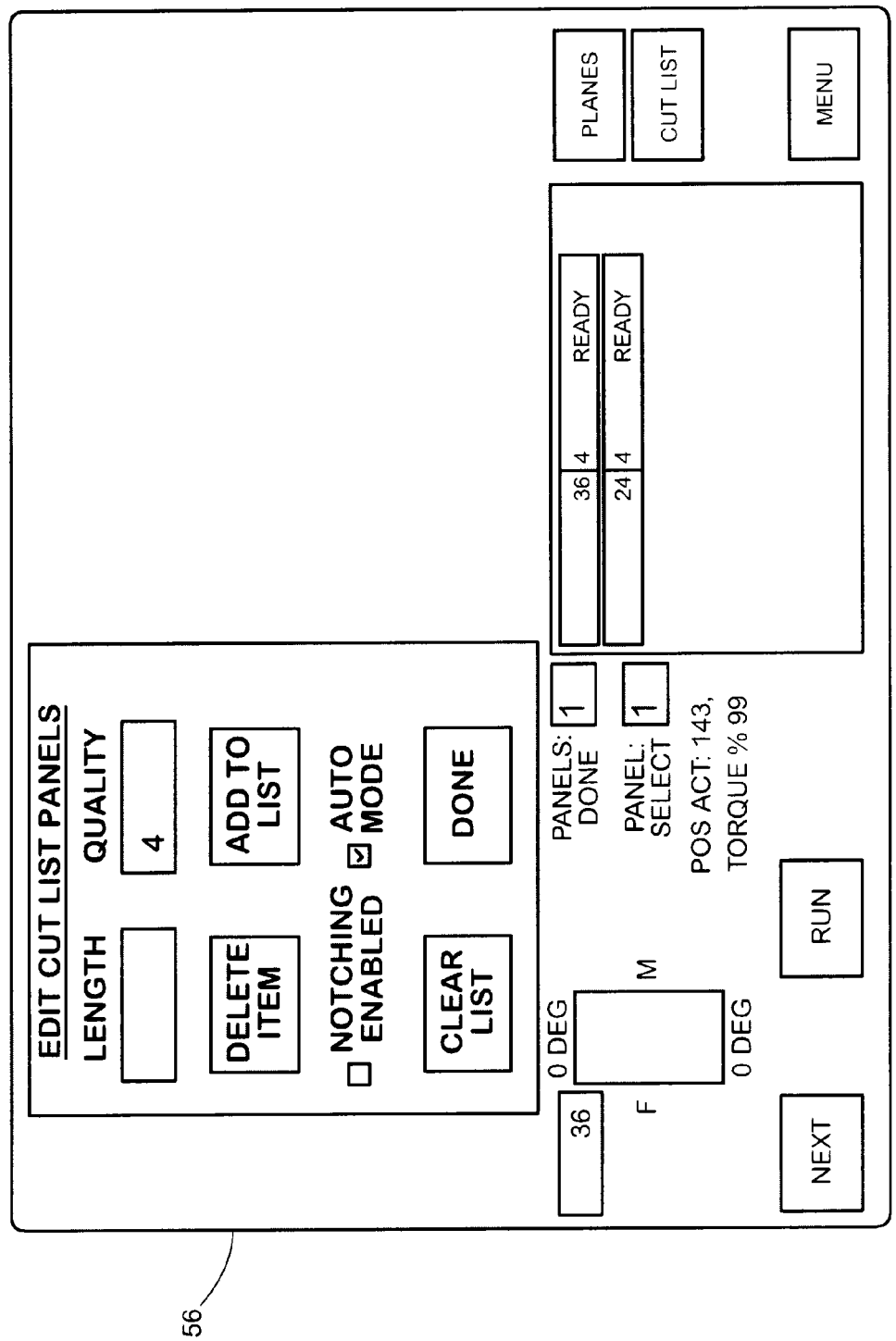
FIG. 8 is an alternative user interface generated by the programmable controller.

FIG. 8 depicts yet another user interface which allows an operator to select various other parameters regarding the panels created by the forming machine 10. In the depicted example, the operator can select whether notching of the panels by the notching device 60 is enabled, or the operator can allow the forming machine 10 to determine whether notching is advisable. In some embodiments, the operator may enter dimensions, a number of panels, and how and where to notch a panel (if at all) in order to generate panels without an imported layout. In other words, an operator can manipulate a user interface provided by the controller 56 and enter information in order to manually generate one or more panels.

Figure 9:
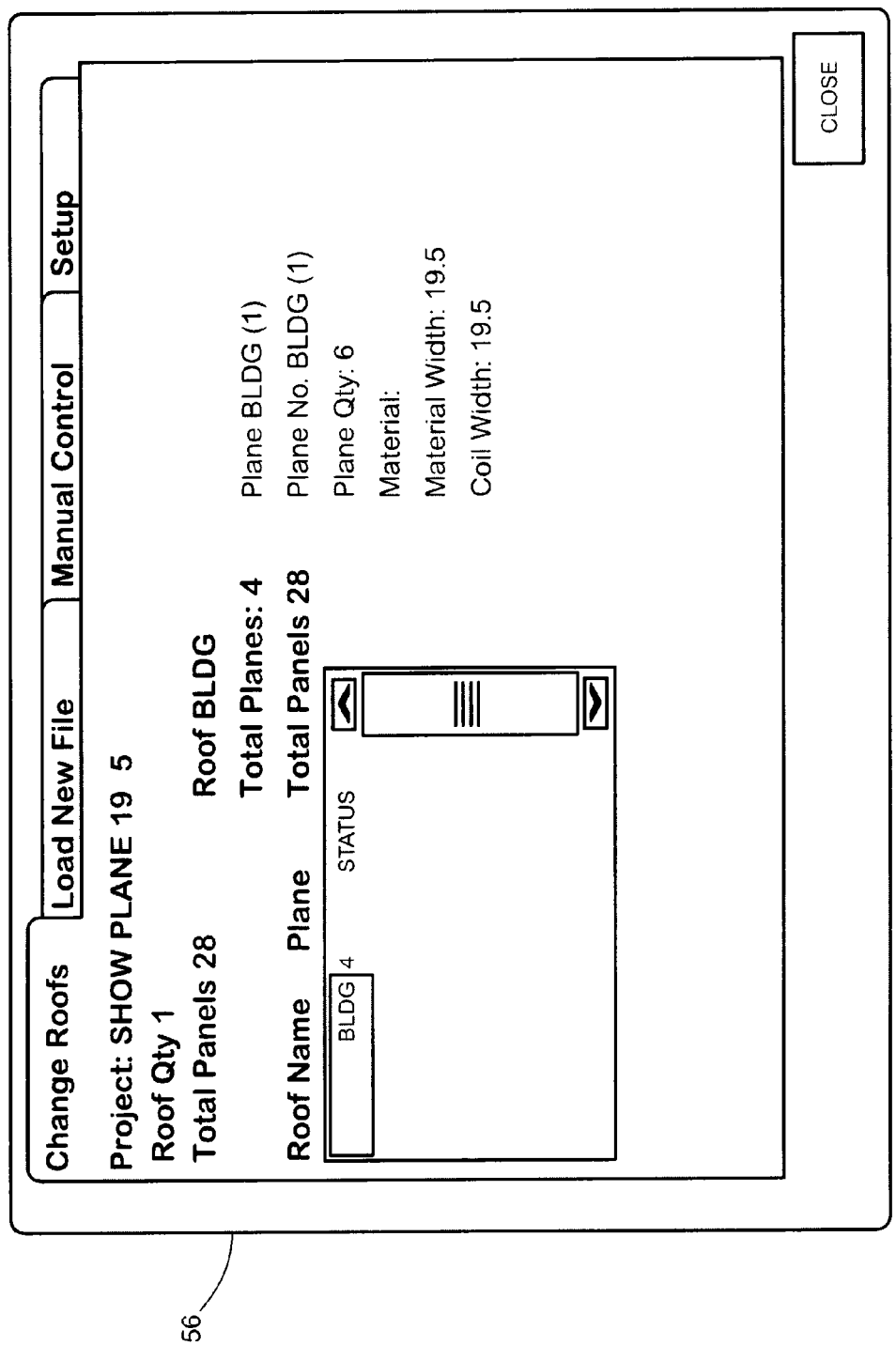
FIG. 9 is an alternative user interface generated by the programmable controller.

FIG. 9 depicts an alternative user interface illustrating other potential functionality implemented by the programmable controller 56. In the depicted example, the programmable controller 56 can allow an operator to store and/or access various layouts for various structures. For example, the forming machine 10 can facilitate manufacture of a roofing system having various planes made up of various panels. Such a complex structure can include hundreds or even thousands of panels. Accordingly, the controller 56 can store a layout of the structure and determine the length, angle, and other dimensions of each metal panel comprising the structure and direct the forming machine 10 accordingly.

The user interfaces generated by the controller 56 also allow an operator to advance the controller 56 to the next panel after a panel is generated and cut by the exit cutter 14. In other words, when the forming machine 10, as directed by the controller 56, generates a panel (that is cut by an operator at the exit cutter 14), the machine can pause and allow the operator to advance the program to the next panel that is needed for a given layout. In one embodiment, the operator can advance the program by interacting with the touch screen 110, pause button 144, or other input devices and/or buttons positioned elsewhere on the forming machine (e.g. adjacent to or within reach of the exit cutter, etc.).

Figure 10:
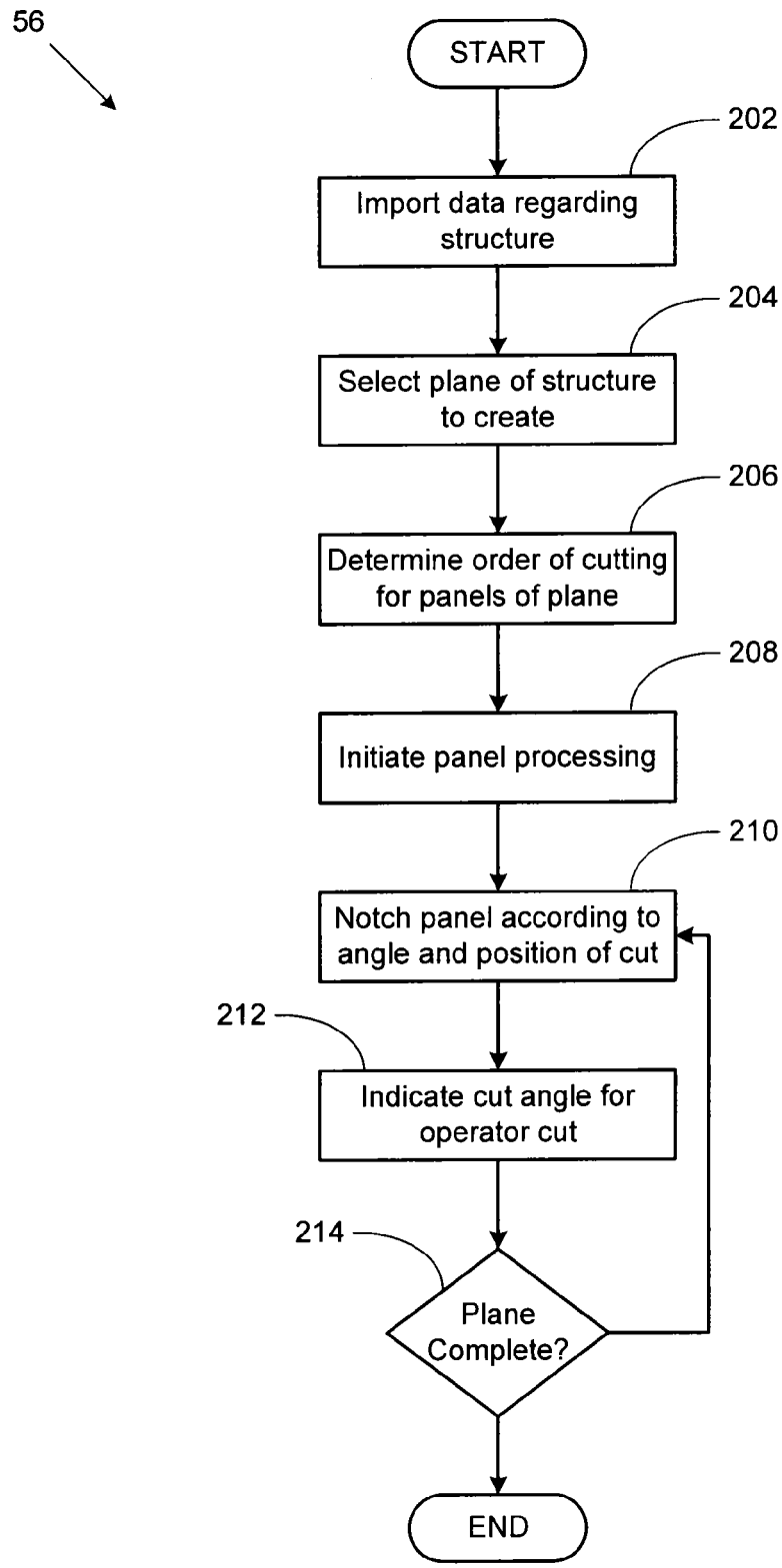
FIG. 10 is a flow chart showing the steps taken by the controller in notching and cutting a panel.

FIG. 10 depicts a flow diagram of one example of execution of the programmable controller 56 creating one or more panels comprising a structure. Alternatively, the flow chart of FIG. 10 can be implemented as a method or process. First, in box 202, data regarding the layout of a structure are imported into the programmable controller 56. As noted above, a layout of a structure (e.g., a roofing system) can be imported into the controller 56 via a network access, IO device (e.g., a USB memory device), etc. As also noted above, a structure can include various planes, peaks, valleys, pitches, etc. of varying complexity. Accordingly, the controller 56 determines a series of panels that are required for each plane of each surface of the imported structure. In one embodiment, the controller 56 can process a layout of a completed structure and reduce the structure into a series of planes.

Then, in box 204 an operator can decide (or rely on the controller 56 to decide for him) a plane of the structure he desires to create. In one embodiment, the controller 56 can display via the layout of the structure and identify the plane of the structure that is being produced. In box 206, upon identification of a plane for production, the order of panel cuts can be determined. Again, an operator can choose an order or rely on the controller 56 to choose an order of cutting. As noted above, panels comprising a plane can be cut left-to-right, right-to-left, center-out in either direction, or any order that can be appreciated.

Then, in box 208, an operator can initiate panel processing, or the process of moving metal through the notching device 60, the roll former 12, and the exit cutter 14 in order to create panels of a structure or plane. Accordingly, the controller can activate a means of moving material through the forming machine 10, whether it is a feed wheel or the rolling dies 52 of the roll former 12, the decoiler reel 16, or other device for moving material through the machine. The controller 56 can specify a rate depending on the material employed or the desires of the operator in order to move material through the notching device 60. In box 210, the operator or controller can direct the notching device 60 to make notches on either edge of the material, which is then moved through the roll former 12. The roll former 12 can form a male edge and a female edge on the edges of the material.

The controller 56 can then, in box 212, indicate an angle for an operator to cut the material arriving at the exit cutter 14. To facilitate cutting, the controller 56 can pause the moving of material through the forming machine 10, providing an opportunity for an operator to clamp the exiting material and select the proper indicated cutting angle on the exit cutter 14. Upon making a cut with the exit cutter 14, the operator can cause the controller 56 to resume the process via a resume button or other input device as can be appreciated. In box 214, the controller can determine whether the plane is complete, or whether each panel of a plane has been created. If not, the controller 56 can continue moving material through the forming machine and return to box 210. If so, the controller 56 can terminate. In some embodiments, the controller can simply queue the next plane for construction or allow the operator to choose the next plane of the structure.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the functionality of various embodiments are described above with respect to FIGS. 1-10 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present disclosure and protected by the following claims.

Therefore, having thus described the invention, at least the following is claimed:

1. A programmable forming machine adapted to receive an elongated sheet of a formable material with two edges and operative to form the elongated sheet in accordance with a selected profile comprising a length and a cutting angle wherein the programmable forming machine further comprises:
   a. a roll former having an entrance, a metal cutter, an exit and two sides with a removable cassette on each of the two sides for forming the selected profile on the elongated sheet of the formable material, wherein the removable cassette includes a plurality of rolling dies and each of the plurality of rolling dies corresponds to one of a plurality of profiles;

b. a means for moving the elongated sheet of the formable material through the roll former;

c. an exit cutter proximate to the exit of the roll former to receive a profiled sheet and enabled to cut the elongated sheet at the length of the selected profile and with the cutting angle of the selected profile; and d. a programmable controller for directing the means for moving the elongated sheet of the formable material through the roll former and directing the exit cutter to cut the elongated sheet of the formable material at the length and the cutting angle of the selected profile, wherein the programmable controller is configured to import an electronic representation of a building and determine the selected profile based at least in part on the electronic representation.

2. The programmable forming machine of claim 1 further comprising a notching apparatus selectively enabled to punch a notch or a hole in an edge of the formable material as directed by the programmable controller prior to the formable material entering the roll former, with the notching apparatus further selectively enabled to punch the notch or the hole in the edge at a location selected for cutting the elongated sheet by the metal cutter and the exit cutter as directed by the programmable controller.

3. The programmable forming machine of claim 1, further comprising a decoiler reel for holding a roll of the formable material for entrance into the roll former.

4. The programmable forming machine of claim 3 in which the means for moving the elongated sheet of the formable material through the roll former is the removable cassette on each of the two sides.

5. The programmable forming machine of claim 1 in which the exit cutter comprises a rotary shear attached to a turntable selectively enabled to turn to the cutting angle for cutting the formable material through a notch or a hole in each of the two edges of the formable material as directed by the programmable controller.

6. The programmable forming machine of claim 1, wherein the programmable controller displays the cutting angle for cutting the formable material on a display device and the programmable controller further comprises a pausing means for stopping the formable material to allow the exit cutter to cut the elongated sheet at the cutting angle.

7. The programmable forming machine of claim 1, further comprising:

a notching apparatus selectively enabled to punch notches or holes in edges of the formable material as directed by the programmable controller prior to the formable material entering the roll former, with the notching apparatus further selectively enabled to punch a notch or a hole in the formable material in an edge at a location selected for cutting the elongated sheet by the metal cutter and the exit cutter as directed by the programmable controller;

a decoiler for holding a roll of the formable material for entrance into the roll former in which the means for moving the formable material through the roll former comprises at least one roller located on each side of the roll former for pulling the formable material off of the decoiler and through the notching apparatus and through the roll former as directed by the programmable controller; and the exit cutter further comprises a rotary shear attached to a turntable selectively enabled to turn to the cutting angle for cutting the elongated sheet of the formable material as directed by the programmable controller.

8. The programmable forming machine of claim 7 in which the programmable controller is programmed to:

analyze a dimension and a design of a roof entered into the programmable controller;

direct the notching apparatus to form the notch or the hole in the formable material in accordance with the dimension and the design of the roof;

direct the removable cassette located on each of the two sides of the roll former to pull the formable material in accordance with the dimension and the design of the roof; and direct the exit cutter to cut the elongated sheet of the formable material at the length and the cutting angle of the selected profile in accordance with the dimension and the design of the roof.

9. The programmable forming machine of claim 5 in which the rotary shear of the exit cutter is manually operable.

10. The programmable forming machine of claim 5 in which the rotary shear is powered by a power means directed by the programmable controller.

11. A programmable forming machine adapted to receive an elongated sheet of a formable material with at least two edges and operative to form a selected profile comprising a selected length, and an angled end or a straight end thereon, comprising:

a. a roll former having an entrance, a metal cutter, an exit and at least two sides with one or more rollers on each of the at least two sides for forming the selected profile on the elongated sheet of the formable material;

b. a means for moving the elongated sheet of the formable material through the roll former;

c. an exit cutter proximate to the exit of the roll former and configured to receive the elongated sheet and selectively enabled to cut the elongated sheet at the selected length and cut the angled end or the straight end;

d. a programmable controller for directing the means for moving the elongated sheet of the formable material through the roll former and directing the exit cutter to cut the elongated sheet at the selected length and with the angled end or the straight end, wherein the programmable controller is configured to import an electronic representation of a building and determine the selected profile for an appropriate panel based on the electronic representation;

e. a notching apparatus selectively enabled to punch a notch or a hole in at least one edge of the elongated sheet of the formable material as directed by the programmable controller and prior to the elongated sheet of the formable material entering the roll former, with the notching apparatus further selectively enabled to punch the notch or the hole in the elongated sheet of the formable material in the at least one edge at a location selected for cutting the elongated sheet by the metal cutter or the exit cutter as directed by the programmable controller; and f. a decoiler reel for holding a roll of the elongated sheet of the formable material for entrance into the roll former.

12. The programmable forming machine of claim 11 in which the means for moving comprises the one or more rollers on each of the at least two sides.

13. The programmable forming machine of claim 11 in which the exit cutter comprises a rotary shear attached to a turntable selectively enabled to turn to a selected angle for cutting the elongated sheet of the formable material through the notch or the hole in each edge of the at least two edges of the elongated sheet of the formable material as directed by the programmable controller.

14. A programmable forming machine adapted to receive an elongated sheet of formable material with two edges and operative to form a selected profile comprising a length and an angled end or a straight end, comprising:
   a. a roll former having an entrance, a metal cutter, an exit and two sides with rollers on each of the two sides for forming the selected profile on the elongated sheet of the formable material;
   b. a means for moving the elongated sheet of the formable material through the roll former;
   c. an exit cutter proximate to the exit of the roll former and configured to receive the elongated sheet and enabled to cut the elongated sheet to the length and with the angled end or the straight end of the selected profile;
   d. a programmable controller for directing the means for moving the elongated sheet of the formable material through the roll former and directing the exit cutter to cut the elongated sheet of formable material, wherein the programmable controller is configured to direct the means for moving and the exit cutter according to a measurement of a roofing system imported from a measurement device; and
   e. a display electrically connected to the programmable controller that renders a user interface.

15. The programmable forming machine of claim 14, further comprising an input apparatus electrically connected to the programmable controller to obtain a user interaction.

16. The programmable forming machine of claim 14, further comprising an input apparatus wirelessly connected to the programmable controller to obtain a user interaction.

17. The programmable forming machine of claim 15, wherein the user interaction programmatically controls the programmable forming machine.

18. The programmable forming machine of claim 14, further comprising a network interface, electrically connected to the programmable controller, that permits a computing device to communicate with the programmable controller over a network.

19. The programmable forming machine of claim 18, wherein the network interface further permits the computing device to programmatically control the programmable forming machine.

20. The programmable forming machine of claim 14, further comprising a means for reading a non-transitory computer-readable medium that programmatically controls the programmable forming machine.

* * * * *